United States Patent [19]

Foley et al.

[11] Patent Number: 4,518,627
[45] Date of Patent: May 21, 1985

[54] APPARATUS AND METHOD FOR DISORIENTING MAGNETIC PARTICLES IN MAGNETIC RECORDING MEDIA

[75] Inventors: James Foley, Wellesley; Fawwaz Habbal, Cambridge; John Leahy, Burlington, all of Mass.

[73] Assignee: Polaroid Corporation, Cambridge, Mass.

[21] Appl. No.: 646,770

[22] Filed: Sep. 4, 1984

[51] Int. Cl.³ .............................................. H01F 10/02
[52] U.S. Cl. ...................................... 427/48; 118/623; 427/128; 427/130
[58] Field of Search ................ 118/623; 427/127–132, 427/48

[56] References Cited
U.S. PATENT DOCUMENTS

| | | | |
|---|---|---|---|
| 3,095,319 | 6/1963 | Williams | 117/107 |
| 3,117,065 | 1/1964 | Wootten | 204/20 |
| 4,208,447 | 6/1980 | Bate et al. | 427/48 |
| 4,271,782 | 6/1981 | Bate et al. | 118/623 |
| 4,338,643 | 7/1982 | Tadokoro | 360/135 |

Primary Examiner—Bernard D. Pianalto
Attorney, Agent, or Firm—John S. Vale

[57] ABSTRACT

An apparatus and method are provided for magnetically disorienting magnetic particles in a magnetic layer of a web coated recording medium that is designed to be used in the manufacture of flexible disks. Disorientation is achieved by subjecting the particles in a fluid pigment carried on a linear web to a rotating magnetic field that projects into the plane of the fluid layer and is rotated about an axis perpendicular to the plane. The interaction of the rotating field with the magnetic particles also has a smoothing effect on the outer surface of the magnetic layer.

28 Claims, 9 Drawing Figures

APPARATUS AND METHOD FOR DISORIENTING MAGNETIC PARTICLES IN MAGNETIC RECORDING MEDIA

BACKGROUND OF THE INVENTION

The present invention relates to the field of magnetic recording media and, more specifically, to apparatus and methods for disorienting acicular magnetic particles in the magnetic layer of a recording medium that is designed for use in fabricating magnetic recording disks, especially flexible disks.

Magnetic recording media having a magnetic layer, comprising anisotropic acicular magnetic particles dispersed in a binder, coated on a nonmagnetic support are well known in the art. In audio and video recording tapes configured for longitudinal recording, it is desirable to align or orient the magnetic particles such that they lie substantially parallel to the support in the direction of tape travel past the read/write head to achieve maximum recording density and signal output.

If, however, such an oriented tape medium is used in the fabrication of a flexible or floppy recording disk(e.g. by punching a disk out of a web of the tape medium) the disk will exhibit unacceptable variations in signal output level because of the constantly changing orientation of the aligned particles on the rotating disk with respect to the disk drive recording head which only moves radially with respect to the disk. That is, when a constant amplitude input signal is recorded on a circular recording track and then read, it will have a sinusoidal wave form which exhibits two maximums, 180° apart, where the oriented particles are aligned with the head, and two minimums, at 90° with respect to the maximums, where the particles are transverse to the head.

To overcome this problem, two different types of recording media are used in fabricating magnetic recording disks. In one type, the particles are circularly oriented about the axis of disk rotation so that they lie along the recording tracks. In the other type, the particles are intentionally disoriented to provide a random directional distribution of particles so that the disk drive head does not "see" any predominant particle alignment direction during the course of a complete revolution of the disk. The need to disorient the particles arises from the fact that the particles generally become somewhat oriented as a result of a coating operation. This is especially true in web coating wherein the particles tend to become mechanically aligned in the direction of web movement past the coater.

Magnetic recording media employing acicular magnetic particles dispersed in a binder generally are formed by coating, or otherwise applying, a fluid magnetic pigment or paint layer on a nonmagnetic substrate, subjecting the magnetic layer to a magnetic field while the paint is still fluid to orient or disorient the particles, as the case may be, and drying the paint to at least partially solidify the binder and fix the position of the particles therein. Also, before the binder is completely solidified the medium may be calendered, or otherwise treated, to enhance the surface smoothness of the magnetic layer.

The magnetic paint generally is a dispersion of anisotropic acicular magnetic particles, binder, and other optional additives (e.g. lubricant, abrasive, anti-static agent, dispersent, etc.) in a sufficient amount of solvent to provide the appropriate fluidized state to faciltate the coating operation. The orienting or disorienting magnetic field is applied while the paint is still fluid so that the magnetic particles may physically move and rotate within the paint in response to the applied magnetic field to achieve the desired orientation or disorientation.

In recent years, magnetic disk media have been significantly improved in terms of increased data recording density. Improvements in composition and processing of the magnetic layer has yielded increases in linear bit density (bits per inch) along the recorded track, while more precise disk drive mechanisms and servo techniques for locating the head in relation to the recording tracks have provided higher track densities (tracks per inch).

Further improvements in linear bit density are expected to be achieved through the use of smaller magnetic particles. However, to prevent self-demagnetization by adjacent opposing magnetic regions in the disk, the particles will have to be of higher coercivity and the magnetic layer will be thinner. Also, it is very important that the surface finish be as smooth as possible to minimize the head to media distance, head bounce and dropouts.

There are many contributing factors to achieving a smooth surface finish. These inlcude a surface finish of the non-magnetic support on which the magnetic layer is applied, the degree of uniformity of the paint dispersion, and the various steps in the manufacturing process.

Web coating apparatus tend to have a somewhat negative impact on smoothness in that the fluid paint layer generally exhibits a microscopic texture attributable to the particular type of coater used to apply the magnetic paint. For example, doctor blade and slot extrusion coaters tend to induce minute longitudinal striations along coating direction while gravure roll coating tends to produce a dot pattern texture.

The application of a particle orienting or disorienting field may have a detrimental affect on surface smoothness if the field agitates the particles so vigorously within paint as to cause surface blemishes. As particle coercivity increases, stronger magnetic fields will be required to move the particles.

Post drying calendering on the other hand is a positive contributor to smoothness whereby the magnetic layer is pressed against a smooth roll surface before the binder is fully cured to flatten surface irregularities.

While a recording disk medium that employs circular particle orientation may provide somewhat higher signal output than a disoriented particle medium, it tends to be very much more expensive because it does not readily lend itself to highspeed volume production.

For example, one method of fabricating a circular particle orientation disk is to mount a disk substrate on a rotating support, spray or otherwise apply a magnetic layer, and then orient the particles by subjecting the fluid layer to a magnetic field prior to solidification of the binder. Because such disks must be made one at a time, the process is inherently expensive.

Another method disclosed in British Pat. No. GB1416495, employs the steps of coating the magnetic layer on a continuous web support, applying a circular magnetic field to sequential disk area zones on the web to achieve circular particle orientation in each zone, and after drying and curing, punching a disk out of each zone. This method also tends to be expensive because the web must be stopped or moved relatively slowly at the particle orientation station or else smearing will occur thus severely limiting the quantity of coated web output for a given time period. Also, additional expense is incurred because of the tight process tolerances needed to insure that the rotational axis of the stamped disk coincides with the axis of the circular array of particles.

Disoriented particle media on the other hand has the potential for being very much less expensive in that the magnetic layer may be coated on the support at relatively high and economical web speeds. Also, because the disk punching dyes do not have to be registered with circular particle orientation zones on the web, the stamping operation may be carried out at the higher medium transport speeds to reduce costs. Additional economy may be realized in that the disoriented particle media may be fabricated on essentially the same production equipment as oriented particle video or audio tape simply by changing the particle orientation device.

Apparatus and methods for magnetically disorienting acicular magnetic particles in a fluid magnetic layer prior to drying and/or curing the layer are known in the art.

For example, U.S. Pat. No. 4,338,643 discloses a web coated magnetic recording media wherein the magnetic particles in a fluid magnetic layer on the moving web are first oriented with a magnetic field to form a herringbone pattern of adjacent 5 mm striped zones with particles in adjacent zones having a different direction orientation with respect to the direction of web movement. After leaving the orientation field, the magnetic particles in adjacent zones interact with each other at the boundries of the zones and, as time goes by, the particles become nearly random before the magnetic layer is solidified.

The herringbone pattern is established by passing the freshly coated web over a fixed array of permanent magnets which cooperate to define a static magnetic field having various field components set at different predetermined angles to the direction of web movement. Because a certain unspecified time period is required for the highly oriented particles to interact and redistribute in a random manner, it would seem this process may not lend itself to economical high volume production in that subsequent manufacturing steps, such as drying or irradiating the paint to promote at least partial curing of the binder, may not be able to be done immediately following the orientation step.

U.S. Pat. Nos. 4,208,447 and 4,271,782 are directed, respectively, to a method and apparatus for magnetically disorienting magnetic particles in a web coated medium by passing the web, with the still fluid magnetic paint thereon, over a fixed array of permanent magnets which cooperate to define a static magnetic field which diminishes in strength in the direction of web movement and includes field components of alternating direction and reversing orientation. For optimum results, the planar array of permanent magnets must be precisely spaced and inclined with respect to the plane of the fluid paint layer, a condition which may be difficult to maintain economically in a high volume production environment.

The above noted particle disorientation methods have a common feature in that both employ a complex static magnetic field through which the still fluid magnetic layer is advanced to reorder the particle distribution.

As noted earlier, it is very important in terms of performance and reliability that the surface of the magnetic layer be as smooth as possible. It has been observed that passage of fluid magnetic layer through a static disorienting field does not significantly smooth out the surface texture induced by the coating apparatus, and in some cases the field may produce additional texturing that further degrades surface quality.

As will become apparent later, the present invention provides an apparatus and method for magnetically disorienting the magnetic particles in a web coated recording medium wherein the disorienting magnetic field is not static, but rather is made to rotate in the plane of the fluid coating about an axis that is substantially normal or perpendicular to the plane. In addition to providing effective particle disorientation, this method also unexpectedly improves the surface quality of the magnetic layer by smoothing out the texture induced by the coating apparatus.

Therefore, it is an object of the present invention to provide an apparatus and method for facilitating the production of high quality magnetic recording media.

Another object is to provide an apparatus and method for improving the smoothness of a magnetic recording layer carried on a non-magnetic support.

Yet another object is to provide a method for magnetically disorienting magnetic particles in a magnetic layer of a recording medium that is to be used in the fabrication of magnetic recording disks.

Still another object is to provide an apparatus for facilitating the implementation of such a particle disorientation method.

Another object is to provide such a particle disorientation method that is compatible with economical high volume production of magnetic recording media.

Yet another object is to provide a method and apparatus that are useful in the production of a magnetic recording medium having improved physical and magnetic recording characteristics including, for example, smoothness of the magnetic layer and signal to noise ratio.

Other objects of the invention will, in part, be obvious and will, in part, appear hereinafter.

SUMMARY OF THE INVENTION

The present invention provides an apparatus and method for disorienting magnetic particles in a magnetic layer of a recording medium, especially a medium intended for use in the fabrication of magnetic recording disks.

The apparatus is used during manufacture of the recording medium for magnetically disorienting the magnetic particles in a fluid magnetic layer carried on a non-magnetic support which is moving so that the magnetic layer advances in a plane.

The apparatus comprises structure for defining a magnetic field that projects into the plane of the fluid layer and is disposed about an axis of rotation that is substantially perpendicular to the plane, and means for effecting rotation of the field so it interacts magnetically with the particles to cause disorientation of the particles within the magnetic layer.

In the illustrated embodiment, the field is provided by an array of permanent magnets arranged on a rotatable disk that is positioned just below the moving support carrying the fluid magnetic layer. The permanent magnets are arranged in a planar array with some magnets having their north pole facing the fluid layer and others having their south poles facing the fluid layer. Acting in concert, the magnets define a composite magnetic field formed by a plurality of local field components, at least some of which have field directions that vary with respect to the plane of the fluid magnet layer.

In operation, the apparatus is located just downstream of a coating station where a fluid magnetic pigment is applied to a linearly moving non-magnetic support to form a thin layer thereon. The permanent magnets are arranged in a magnet plane that is substantially parallel to the plane of the magnetic layer. The disk is rotated within a range of velocities correlated to the linear velocity of the support to effectively disorient the particles. Advantageously, the interaction of the rotating field with the magnetic particles causes the pigment to flow and results in a smoothing of the outer surface of the magnetic layer. Following the application of the rotating field, the magnetic layer is dried to fix the positions of the disoriented particles therein.

The apparatus and method also may be used in the manufacture of oriented particle magnetic media, such as video tape, to take advantage of the smoothing characteristics. In this case the rotating field is applied to smooth the fluid layer and then the layer is subjected to an orienting magnetic field further downstream to align the particles.

BRIEF DESCRIPTION OF THE DRAWINGS

For a fuller understanding of the nature and objects of the invention, reference is made to the following detailed description and accompanying drawings wherein.

DESCRIPTION OF THE PREFERRED EMBODIMENT

The present invention provides an apparatus and method for magnetically disorienting anisotropic magnetic particles in the magnetic layer or layers of a web coated magnetic recording medium that is specifically designed for use in fabricating flexible or floppy disks. Advantageously, the disorientation method also improves the smoothness of the magnetic layer, and this characteristic can be used beneficially in the manufacture of other types of magnetic media such as oriented magnetic tape.

Figure 1:
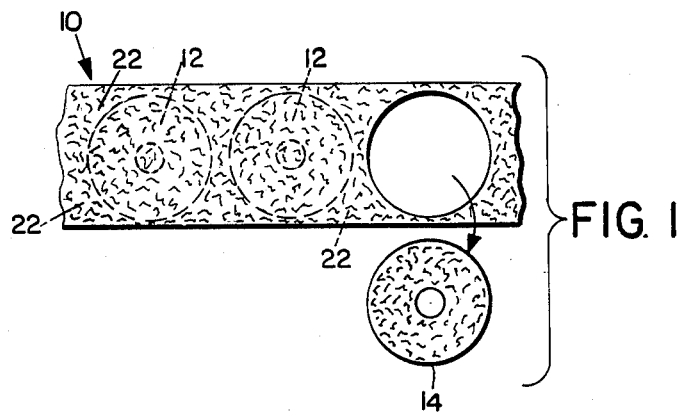
FIG. 1 is a diagrammatic plan view of a length of magnetic recording medium from which disks are fabricated.

FIG. 1 shows a diagrammatic plan view of a length of flexible magnetic recording medium 10 having indicated thereon, in dotted lines, circular areas 12 from which flexible recording disks 14 are stamped using die punching techniques that are well known in the art. The disks 14 are later packaged in plastic or paper envelopes and are marketed as digital data recording diskettes for use in disk drives associated with computers.

Figure 2:
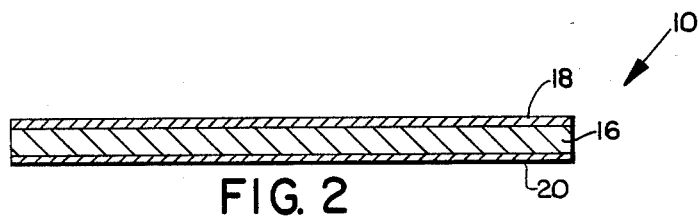
FIG. 2 is a longitudinal cross sectional view of the medium.

As diagramatically shown in FIG. 2, medium 10 comprises a flexible, nonmagnetic sheet or web support 16 having thin magnetic recording layers 18 and 20 adhered to opposite sides thereof.

Support 16 preferably is a flexible plastic film formed of polyethylene telephthalate (PET) or other suitable nonmagnetic substrate material known in the magnetic recording art.

The magnetic layers 18 and 20 are intended to be identical so data may be recorded on both sides of the disk 14, and any further description of magnetic layer 18 herein shall apply to magnetic layer 20 as well. Layer 18, as will be described in detail later, is initially provided as a fluid magnetic paint or pigment that is coated on support 16 and later dried and cured. Such a paint generally comprises anisotropic acicular magnetic particles (e.g. gamma ferric oxide), optional additives, and binder dispersed in a sufficient amount of solvent to achieve a fluidized state suitable for the coating operation.

One function of the apparatus and method embodying the present invention is to magnetically arrange the distribution of needlelike magnetic particles 22 (diagrammatically shown in FIG. 1 greatly enlarged) within the layers 18 and 20, while the layers are still in a fluid state, so that at least on a statistical basis the long dimension of a majority of the particles lie substantially parallel to the plane of the support 16 and the corresponding magnetic layers thereon, and are essentially unoriented directionally (coincident with the long dimension) with respect to each other within the plane of the magnetic layer. That is, the particles are intentionally disoriented to provide a substantially random distribution of particle directions with respect to any imaginary line in the plane of the magnetic layer. By disorienting the particles in this manner, the layers 18 and 20 on disk 14 exhibit more or less uniform magnetic characteristics as the disk 14 rotates in a disk drive because the read/write head does not encounter any predominant particle alignment direction along the circular recording tracks. Thus, when a constant amplitude signal is recorded along the entire length of a circular track and subsequently read, variations in the output signal level (modulation) as a function of angular displacement are minimized.

Figure 3:
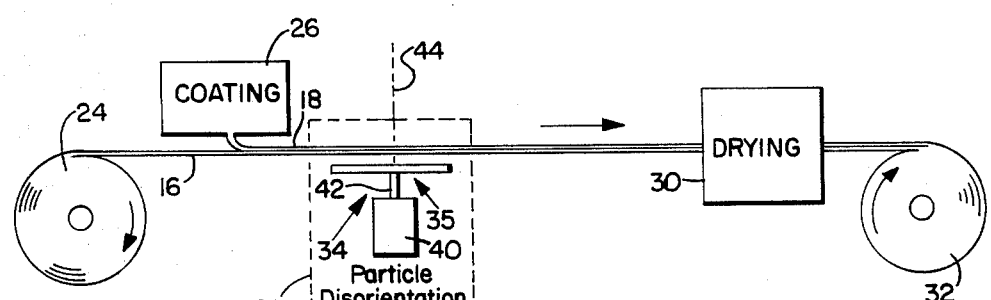
FIG. 3 is a diagrammatic illustration of a production line for making an unoriented recording medium, including a magnetic particle disorientation apparatus embodying the present invention.

The particle disorientation method embodying the present invention preferably is practiced as part of a process, shown diagrammatically in FIG. 3, for manufacturing the web coated medium 10.

The nonmagnetic flexible support 16 is advanced from a supply reel 24 through a plurality of successive work stations, including coating station 26, a particle disorientation station 28 and a drying station 30, to a take-up reel 32. Supply and take-up reels 24 and 32 are rotatably driven by drive mechanisms (not shown) so that support 16 advances longitudinally (in the direction of the arrow) along the production path at a constant linear velocity, e.g. in the range of 100–1000 ft/minute.

At coating station 26, a thin fluid magnetic paint layer 18 is applied to the top surface of support 16. The coating may be applied with any suitable coating apparatus such as a doctor blade, gravure roll or slot extrusion coater. Typically, the magnetic paint comprises a dispersion of acicular magnetic particles, polymeric binder, lubricant, abrasive particles, dispersants, antistatic agent, and solvent.

While the layer 18 is still in a fluid state, support 16 passes through disorientation station 28 which includes a later to be described apparatus 34 for magnetically disorienting particles 22 by subjecting layer 18 to a rotating magnetic field which is effective to physically move the particles 22 in the fluid paint and thereby achieve the desired random distribution shown in FIG. 1. From station 28 support 16 passes through drying station 30 where the paint is heated, typically with hot air, to evaporate the solvent and at least partially solidify the binder to fix the positions of the magnetic particles 22 in layer 18 in the arrangement provided by the magnetic field at station 28. Although not shown in the drawings, the support 16 is typically advanced through additional work stations for enhancing the surface smoothness of layer 18 (e.g. a calendering machine) and then curing (crosslinking) the polymeric binder to harden the binder sufficiently so that layer 18 resists abrasion when it comes in contact with the disk drive read/write head.

Depending on the type of crosslinking system incorporated into the binder, curing may be accomplished either chemically by "aging" the medium at elevated temperature or by irradiating the layer 18 with a suitable form of penetrating radiation, e.g. an electron beam.

The second magnetic layer 20 is subsequently applied to the oppposite side of support 16 using the same process to form the medium 10 shown in FIG. 2.

The nonmagnetic support 16 may be of any suitable flexible material, for example a polymeric film such as a polyester (e.g. polyethylene terephthalate), polyolefin, polycarbonate, polyvinyl chloride, polyimide, polyamide, a cellulose derivative, or a nonmagnetic metal foil such as copper, aluminum or zinc.

The anisotropic acicular magnetic particles 22 may be iron oxides such as gamma-$Fe_2O_3$, mixed crystals of gamma-$Fe_2O_3$ and $Fe_3O_4$, cobalt-doped gamma-$Fe_2O_3$ or $Fe_3O_4$; $CrO_2$; various ferrites (such as barium ferrite); ferrimagnetic metal elements or alloys (such as Co, Fe-Co, Fe-Co-Ni, Fe-Co-B, Fe-Co-Cr-B, Mn-Bi, Mn-Al and the like); or iron nitride.

The polymeric binder material typically includes for example, polyurethanes, expoxy resins, polyesters, vinyl chloride-vinyl acetate-vinyl alcohol copolymers, polyvinylidene chloride and the like, and mixtures therefor. Additionally, the binder material may include one or more curing agents to facilitate chemical or irradiation induced cross linking as the case may be.

Other additives in the magnetic paint may include: an antistatic agent, such as carbon black or graphite; abrasive particles, such as fused alumina, silicon carbide, or chromium oxide; a lubricant such as an aliphatic acid ester or organic silicone compound; and a dispersant such as lecithin, or esters of phosphoric acid and the like or combinations of various dispersing agents.

The magnetic paint is generally formed as a dispersion of the magnetic recording composition in an organic solvent such as methyl ethyl ketone, cyclohexanone, medium that has only one magnetic layer on support 16, or has additional coated layers between the support 16 and the magnetic layers (such as an adhesive), or has an additional layer, such as a lubricating layer covering the magnetic layer or layers.

The particle disorienting apparatus 34 in the illustrated embodiment includes a disk assembly 35 comprising a nonmagnetic disk 36 having a circular or annular array of permanent bar magnetics 38 thereon (see FIG. 4), and an air driven motor 40, having its output shaft 42 connected to the underside of disk 36, for rotating disk asssembly 35.

The disk assembly 35 is positioned just downstream of the coating station 26, in close proximity to the underside of the moving support 16 having the still fluid layer 18 thereon so that the plane of the disk 36 is substantially parallel to the plane of support 16 and the disk rotational axis 44 is substantially normal to the planes of support 16 and the layer 18 thereon. As will become apparent later, by positioning apparatus 34 in this manner, a magnetic field defined by the annular array of magnetics 38 projects into the plane of the fluid magnetic layer 18 and is made to rotate about axis 44 by spinning disk assembly 35 to magnetically disorient the magnetic particles 22. For best results, in terms of achieving random particle distribution and a smooth outer surface of layer 18, the rotational velocity of disk assembly 35 is correlated to the linear velocity of the moving support 16 as will be discussed later in detail.

Figure 4:
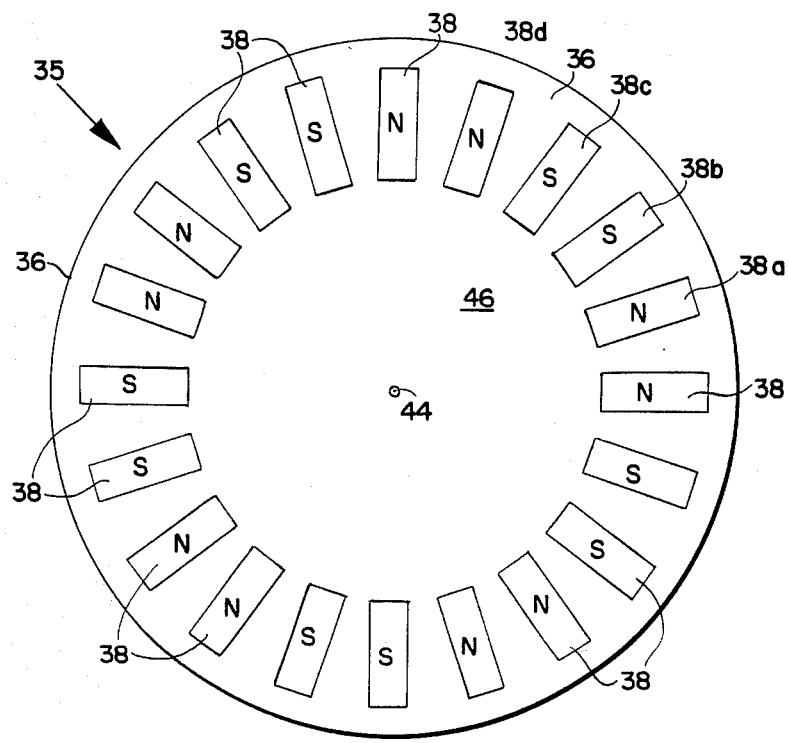
FIG. 4 is a top plan view of a disk assembly which forms part of the disorientation apparatus.
Figure 5:
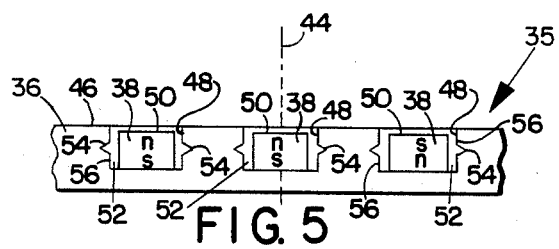
FIG. 5 is a diagrammatic sectional view of a portion of the disk assembly.
Figure 6:
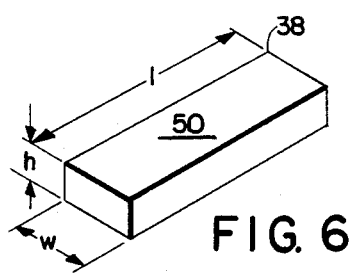
FIG. 6 is a perspective view of a permanent magnet that is used in the disk assembly.

As best shown in FIGS. 4, 5 and 6, the illustrated disk 36 is a rigid circular member preferably formed of a nonmagnetic metal (e.g. aluminum) or a high strength reinforced plastic material capable of withstanding high speed rotation. Extending depthwise down into the disk body from its upper planar surface or face 46 is a plurality of equally spaced, radially extending cavities 48 arranged symetrically about the disk rotational axis 44 in an annular array. Each cavity 48 is configured to receive therein one of the elongated rectangular parallelepiped shaped permanent magnets 38 shown on FIG. 6. Each magnet 38 is positioned in its corresponding cavity 48 with its upper planar pole-faced surface 50 (designated N for north and S for south as the case may be) parallel to and flush or just slightly below the upper disk surface 46. The upper pole faces 50 may be considered as lying in a common magnet plane that is parallel to disk surface 46.

To provide a representative example of the construction of disk assembly 35, it will be assumed that the recording medium 10 is to be used in the fabrication of 5.25 inch diameter flexible disks 14. In this case, the magnetic layer 18 is applied in a 5.5 inch wide coating zone centered on a 7.5 inch wide flexible support 16. Typically, support 16 has a thickness of 1.5-4 mils and the paint has a wet coating thickness of 1.5-8 microns to provide a thickness of 0.5-3 microns after drying, surface treatment and curing.

A disk assembly 35 suitable for this application typically includes an aluminum disk 36 having a diameter of 9 inches and a thickness of 0.5 inches, and an annular array of twenty (20) permanent bar magnets 38 thereon.

The magnets 38, shown in FIG. 6 preferably are formed of a material which is an intermetallic compound of rare earth elements and cobalt. For example, magnets 38 may be summarium cobalt compound ($SmCo_5$) magnet such as the RECOMA 20 magnet marketed by Recoma, Inc., Fairfield, N.J. This is a sintered magnet having high remanence (9,000 Gauss) and coercive field strength (8,500 Oersted). In the illustrated embodiment magnets 38 measure: length (l)=1.5 inches; width (w)=0.5 inches; and height (h)=0.25 inches.

The elongated cavities 48 are slightly larger than magnets 38 and centered on equally spaced radial lines (18° of arc between adjacent lines). One of the magnets 38 is centered in each of the corresponding cavities 48. The cavities 48 are positioned along the radial lines so that the end of the bar magnet 38 closest to the center axis 44 is at a radial distance of 2.75 inches. The length of the magnets 38 is chosen so that the outside diameter of the array is wider than the coating zone. If the array does not overlap the entire coating zone, the field may induce stripes at the outside edges of the coating zone.

In the illustrated embodiment, the cavities 48 are of a depth so that when the magnet 38 is seated therein, the top pole faced surface 50 is approximately 1/32 to 1/16 of an inch below the disk upper surface 46. The magnets 38 preferably are held in the cavities 48 by means of a nonmagnetic adhesive compound 52, for example Cerro Alloy No. 8921K12, a low melting point, non-magnetic metal alloy marketed by McMaster-Carr Supply Co., Chicago, Ill. As best shown on FIG. 5, V-shaped indentations on notches 54 preferably are provided in the side wall 56 of the cavities 48 to mechanically lock the adhesive to the disk body for increased holding power. The alloy is melted and poured into the cavity 48 so that it covers the upper pole surface 50 and is flush with the upper disk surface 46. After the adhesive solidifies, if any excess protrudes above surface 46 it may be removed by sanding or grinding so that the finished disk assembly 35 has a substantially planar upper surface 46.

The particle disorienting apparatus 34 is positioned under the moving support 16 so that the upper surface 46 of the disk is substantially parallel to the plane of the support 16 and is spaced approximately ¼ inch therefrom. Thus, the magnet plane is substantially parallel to the plane of the magnetic layer 18.

The twenty magnets 38 are arranged on disk 36 in alternating like pole facing pairs. That is, the annular array of magnets consists of a repeating sequence of two successive magnets 38 having the north poles N facing upwardly followed by two successive magnets 38 having the south poles S facing upwardly, etc.

The magnets 38 are of sufficient magnetic strength and close packing density so that the flux eminating from each magnet 38 interacts with its next adjacent neighbors on either side. Collectively, these flux interactions or couplings define a complex magnetic field having an overall annular or circular shape centered about the disk axis 44. Of particular interest to the present invention is that portion of the magnetic field that projects into the space above the disk's upper surface 46 and extends into the plane of the fluid magnetic layer 18 on the moving support 16 when the particle disorientation apparatus is located in the operative position at station 28 shown in FIG. 3.

Those skilled in the magnetics art will appreciate that it is extremely difficult to accurately measure or otherwise analyze a composite magnetic field produced by a plurality of individual permanent magnets acting in concert because of the many variables including the strength of the magnets, the shape of the individual magnets and the geometry of the array. At the present time, the exact nature of the composite field produced by the annular array of magnets 38 and how it interacts with the magnetic particle 22 as the field rotates in plane of the linearly moving magnetic layer 18 is not precisely understood. However, some general observations about the directional aspects of the composite magnetic field are offered with reference to FIG. 7.

Figure 7:
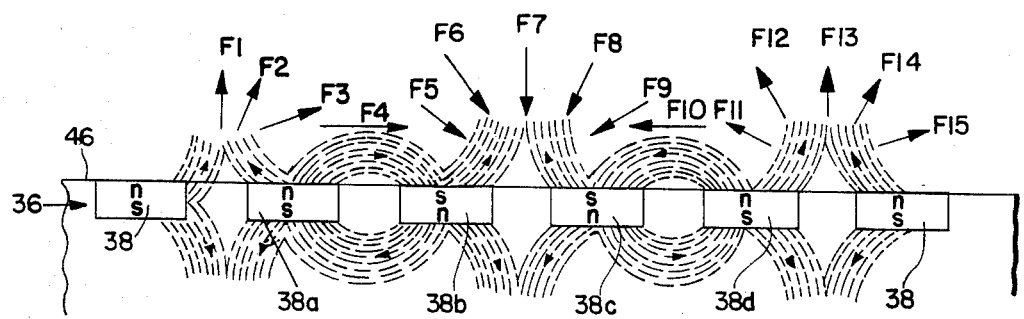
FIG. 7 is a diagrammatic illustration showing certain directional aspects of a composite magnetic field defined by the magnets on the disk assembly.

FIG. 7 is a diagrammatic vertical section taken through a portion of disk assembly 35 along a circular path at a radial distance from axis 44 approximately bisecting the length of magnets 38. Because the magnets 38 lie along radial lines, the spacing between facing sides of adjacent magnets increases with increasing radial distance. This in itself will produce variations in the composite magnetic field as a function of radial distance from axis 44.

In FIG. 7, magnet 38a has its north pole N adjacent disk surface 46 and its opposite south pole S facing downwardly into the body of disk 36. The next magnet 38b (to the right) is oppositely oriented with its south pole S on top. The next magnet 38c also has its south pole S uppermost and the following magnet 38d is inverted with its north pole N uppermost. This orientation sequence repeats in four magnet groups around the array. In the illustrated embodiment, there are five (5) such groups in the array.

The magnets 38 interact to define local components of the overall magnetic field as diagrammatically indicated by the dotted flux lines. A portion of the flux emanating from the upper north pole N of magnet 38a couples to the upper south pole S of the next adjacent magnet 38b to define a local field in the air space above disk surface 46 that has predominant horizontal component parallel to the disk surface 46. Using the conventional standard N to S to designate field direction, the direction of this local field is indicated by an arrow F4 that is parallel to surface 46 and points to the right. Oppositely directed flux coupling similarly occurs in a return path between the bottom poles of magnets 38a and 38b, but the primary interest is in the portion of the composite field that projects into space above the disk and interacts with the magnetic layer 18 on the moving support 16. The pair of magnets 38c and 38d likewise have opposite attractive upper poles, but in the reverse sequence, so they interact to define an oppositely directed local field indicated by the horizontal arrow F10 pointing to the left.

Magnets 38b and 38c, having like repulsive upper south poles S, couple to define upper and lower local fields that have strong vertical components normal to disk surface 46. The upper local field projecting above disk surface 46 is indicated by the vertical downwardly point field direction arrow F7. Similarly, magnet 38a interacts with the like pole north facing magnet 38 to its left and magnet 38d interacts with the like pole north facing magnet 38 to its right to form vertically directed local fields indicated by the upwardly directed vertical field direction arrows F1 and F13, respectively.

Interspersed between the alternating vertical and horizontal local fields are directional transition zones. That is, between the upwardly directed local field F1 and the right directed horizontal field F4, the local field direction progressively tilts downward and to the right, as diagrammatically indicated by successive field direction arrows F2 and F3. Likewise, the directional transition from local field component F4 to F7 is indicated by field direction arrows F5 and F6, etc.

As disk assemblage 35 rotates (e.g. clockwise about axis 44 as viewed in FIG. 4), if one were to observe the directional nature of the composite field defined by the annular array of magnets 38 from a fixed point slightly above disk surface 46 and at a radial distance in the path of travel of magnets 38 to the right of axis 44, one would find that the field direction changes cyclically with the passage of each four magnet group past the fixed observation point. As magnet 38a approaches, the local field is predominantly vertical and directed upwardly away from the disk surface 46. As magnet 38a passes, the local field direction progressively tilts down toward the horizontal direction (to the right in FIG. 7) F4 shown above the gap between magnets 38a and 38b. In the following transition zone over magnet 38b, the local field direction becomes more downwardly directed from the horizontal until it reaches vertical above the gap between magnets 38b and 38c. At this point the field direction has rotated through 180° relative to the magnet plane. The field direction rotation continues progressively through an additional 180° as magnets 38c and 38d pass the observation point whereupon a new cycle of field direction rotation begins above the gap following magnet 38d. Thus as each four magnet group in the array passes the observation point, the local field direction cycles through 360° of rotation over the length of each four magnet group and the composite field has local field components that shift from vertical to horizontal at 90° intervals and alternate in direction at 180° intervals during the course of the cycle.

Because illustrated disk assembly 35 includes five (5) groups of four (4) magnets 38 thus, a 360° cyclic change of local field direction occurs during each successive 72° of rotation of disk assembly 35 past the imaginary observation point. As will be explained later, the disk assembly 35 shown in FIG. 4 is intended to be only illustrative and there are many variations in the geometry of the magnetic field defining array of permanent magnets that will provide the desired particle disorientation and/or surface smoothing functions.

In operation, apparatus 34 is positioned as shown in FIG. 3, with the upper surface 46 of disk 36 substantially parallel to the plane of the moving support 16 and the fluid magnetic layer 18. It has been found that for the particular disk assembly 35 described above, the surface 46 preferably should be located approximately $\frac{1}{4}$ of an inch below the underside of support 16 to achieve satisfactory projection of the composite magnetic field, defined by the annular array of magnets 38, into the plane of the fluid magnetic layer 18 on the upper side of support 16. The spacing between support 16 and the illustrated disk assembly 35 has not been found to be extremely critical, but some adjustments up or down may be required with variations of disk assembly 35 which employ magnets 38 of different strength, size and/or array geometry.

For best disorientation results, it has been observed that there is a correlation between the linear rate at which the particles 22 in the fluid layer 18 travel through the rotating magnetic field and rotational velocity of the composite field defined in terms of the rate of change of local field directions experienced by the particles 22. Broadly speaking, best results are obtained when the composite field is rotated at a velocity relative to the linear web speed whereby the particles that are exiting the field are exposed to the influence of each successive local field component for a duration measured in milliseconds.

For example, employing the particular disk assembly 35 shown in FIG. 4 and advancing the web support 16 at a linear rate of 100 feet per minute (FPM), it is preferable to rotate disk assembly 35 above 800 revolutions per minute (RPM), most preferably at 1000 RPM, to achieve best particle disorientation and surface smoothing results.

Motor 40, which rotatably drives assembly 35, either directly or through an appropriate gear or belt transmission, may be of the variable speed type that is controlled by a motor speed controller (not shown) as is well known in the art.

In general terms, for any given disk assembly geometry, if the linear speed of the web support 16 is decreased significantly, the angular velocity of the disk assembly must be increased accordingly to achieve the desired results. Conversely, if the web speed is increased significantly the rotation velocity of the disk assembly may be decreased proportionately.

Alternatively, the disk 35 may be made larger (e.g. having twice the diameter of the illustrative disk 36) and the number of magnets 38 in the array may be increased accordingly to forty (40). In this case, the rotational velocity of disk assembly 35 it may be reduced by half (to 500 RPM) to achieve the same results because the rate of field direction change experienced by the particles is essentially the same.

As noted earlier, when the fluid magnetic layer is deposited on the moving support 16 by the coating apparatus 26, the upper surface of layer 18 is usually not absolutely smooth and generally exhibits some undesirable microscopic surface texture that is characteristic of the particular type of coating apparatus employed. In addition to disorienting the magnetic particle 22, it has been found that passage of layer 18 through the rotating composite field causes the fluid layer to flow, thereby reducing the surface texture and significantly improving the surface smoothness of layer 18.

The degree of particle disorientation in layer 18 may be assessed by measuring the modulation level of a constant amplitude signal previously recording one circular recording track of a finished disk 14.

To establish a baseline for measurement, a recording medium 10 was made without subjecting it to any disorientation field between the coating and drying stations. Modulation measured on a disk 14 fabrication from this medium was approximately 20% peak to peak. This indicates a degree of particle orientation in the direction of web movement that is most likely attributable to mechanical alignment of particles caused by the coating apparatus.

A variety of commercially available 5¼ inch magnetic recording disks were measured and as a group the average modulation was approximately 11% peak to peak.

Disks 14 fabricated from a medium 10 that was subject to the particle disorientation method embodying the present invention and, on the average, exhibited modulation of 8% peak to peak. This modulation level was indication for both low coercivity particles (approximately 300 Oersted) and higher coercivity particles (approximately 650 Oersted).

Disks were also fabricated from a medium 10 wherein the particle disorientation station 28 includes means for providing a static multidirectional magnetic field that projects into the plane of the fluid magnetic layer 18. The static field was provided by an array of permanent magnets arranged on a fixed plate under the moving web in accordance with the teachings of U.S. Pat. Nos. 4,208,447 and 4,271,782. In disks fabricated from a medium that employed the low coercivity (300 Or) particles in layer 18, the modulation was approximately 8% peak to peak. However, disks that employed the higher coercivity particles in layer 18 exhibited a low degree of particle disorientation and the modulation measured approximately 20% peak to peak.

In addition to reducing the modulation signal, it is also highly desirable to provide disks 14 that have a low signal to noise ratio (S/N) in the interest of reducing the occurrence of data recording and reading errors.

In terms of S/N, it has been observed that the rotating field particle disorientation provide superior results. One possible explanation for this characteristic is that in addition to providing excellent particle disorientation, rotation field tends to smooth out the surface texture induced in layer 18 induced by the coating operation, and it is well recognized by those skilled in the magnetic recording art that the signal to noise ratio improves with increasing surface smoothness.

By way of example, disks were prepared using 300 Oersted particles in magnetic layer 18. When medium 10 was not subjectd to a magnetic disorientation field, S/N measured 61.8 dB. Disorienting the particles with the static field caused the S/N measured to decrease to 59.7 dB. However, when the disorientation was done with the rotating field, utilizing disk assembly 35, the S/N improved to 66.7 dB.

The relative S/N measurements correlate well with corresponding surface smoothness measurements. Using a gloss meter to indicate the smoothness of the upper surface of magnetic layer 18 after single pass calendaring, the non-disoriented medium had a gloss measurement in the range of 88 to 111. The medium subjected to the static field measured in the range of 60 to 93, and the medium that was subjected to the rotating field measured in the range of 99 to 124. Even before calendaring, it is observed that the rotating field produces a superior surface finish.

Figure 8:
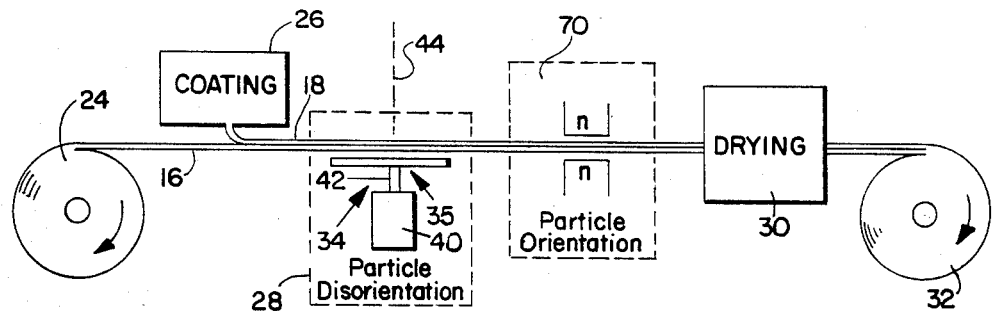
FIG. 8 is similar in some respects to FIG. 3, but is modified with the addition of a particle orientation station for fabricating an oriented recording medium.

The surface smoothing characteristics of the rotating magnetic field may be applied advantageously in the fabrication of oriented particle magnetic media. For example, FIG. 8 diagrammatically shows a video tape production line which is similar in most respects to FIG. 3 except that a particle orientation station 70 has been added between the rotating field apparatus 34 at station 28 and the drying station 30.

In this case the rotating field defined by disk assembly 35 is applied primarily to smooth out the texture in the fluid magnetic layer 18 induced by the coating apparatus. Exposure to the rotating field, of course, also disorients the particles, but the particles are subsequently aligned in the desired direction further downstreaming by an orienting magnetic field which projects into the plane at station 70 in a manner well known in the art. Advantageously, it has been found that the surface smoothing benefits gained at station 28 are not significantly affected by the particle orientation field at station 70.

As noted earlier, the geometry of the magnet array in FIG. 4 is intended to be illustrative of only one preferred embodiment. Many other variations may be employed. Instead of the illustrated magnet sequence of N, N, S, S, poles uppermost, the magnets 38 may be arranged differently to provide an N, S, N, S, etc. sequence resulting in a polarity change with each successive magnet 38 in the array. The number, size, strength and spacing between the magnets 38 may be varied as well as geometric relation between individual magnets or groups of magnets. Of course, with each such variation of array geometry, the rotational velocity of the non-magnetic base mounting the magnets, most likely will have to be adjusted to achieve the desired correlation between the rate of field direction change with respect to the linear velocty of the particles 22 in the moving magnetic layer 18.

The magnet array does not necessarily have to be annular and may occupy a pie-shaped sector of the disk rather than forming a complete circle about axis 44. In this instance the disk would have to be rotated at a much higher velocity to achieve the desired disorientation and/or smoothing effect.

Figure 9:
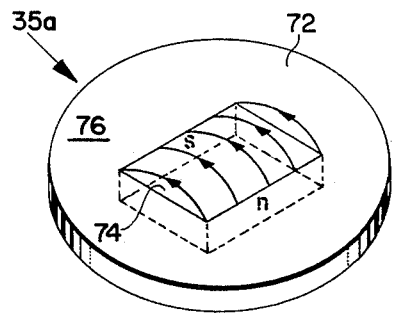
FIG. 9 is a perspective view of an alternative preferred embodiment of a disk assembly forming part of the disorientation apparatus.

In its simplest form, the disk assembly (designated 35A in FIG. 9) may comprise a non-magnetic disk 72 and a single permanent magnet 74, seated in a cavity in the disk upper surface 76, for defining the outwardly projecting magnetic field. In this case the magnet 74 is set on its side with the pole faces perpendicular to disk surface 76 so as to produce the field illustrated by the flux lines. Again, higher disk rotational speed is required to achieve particle disorientation than with the previously described disk assembly 35 shown in FIG. 4.

While the illustrated embodiments have been directed to providing the rotating magnetic field by physically rotating an array of permanent magnets 38, it should be understood the field rotation may be accomplished electrically by employing a static array of electro-magnets that are phase driven by an appropriate control circuit to provide the rotating field effect.

Since certain other changes may be made in the above described apparatus and method without departing from the spirit and scope of the invention herein involved, it is intended that all matter contained in the above description or shown in the accompanying drawings shall be interpreted as being illustrative and not in a limiting sense.

What is claimed is:

1. Apparatus for magnetically disorienting magnetic particles in a fluid magnetic layer carried on a non-magnetic support which is being moved so that the magnetic layer advances in a plane, said apparatus comprising:

means for defining a magnetic field that projects into the plane of the magnetic layer and is disposed about an axis of rotation which is substantially perpendicular to the plane; and means for effecting rotation of said magnetic field about said axis so that said rotating field interacts magnetically with the particles to cause disorientation of the particles in the magnetic layer.

2. The apparatus of claim 1 wherein the magnetic interaction of said rotating field with the magnetic particles also serves to smooth the surface of the fluid magnetic layer.

3. The apparatus of claim 1 wherein said magnetic field is a composite magnetic field formed of a plurality of local field components, at least some of which have different magnetic field directions relative to the plane of the fluid magnetic layer.

4. The apparatus of claim 3 wherein at least some of said local field components have a predominant field direction that is substantially parallel to the plane and others of said local field components have a predominant field direction that is substantially perpendicular to the plane, said local field components being arranged successively within said composite field such that parallel field direction components alternate with perpendicular field direction components.

5. The apparatus of claim 4 wherein successive parallel field direction components have opposite field directions and successive perpendicular field direction components have opposite field directions.

6. The apparatus of claim 4 wherein said local field components are arranged in successive groups about said axis of rotation, and each said group is configured to provide a 360° change of field direction over its length.

7. The apparatus of claim 1 wherein said magnetic field is substantially symetrically disposed about said axis, and is a composite magnetic field formed by a plurality of successive local field components which vary in direction relative to the plane of the magnetic layer.

8. The apparatus of claim 7 wherein said composite field is annular and comprises a plurality of successive groups of said local field components, each said group providing a 360° rotational change of field direction over its length.

9. The apparatus of claim 1 wherein the nonmagnetic support having the magnetic layer thereon is moved at a given linear velocity, and wherein said magnetic field is a composite field defined by a plurality of successive local field components, at least some of which vary in field direction relative to the plane of the magnetic layer, and said means for effecting rotation of said magnetic field is configured to rotate said field within a range of rotational velocities that are correlated to the linear velocity of the magnetic layer such that the magnetic particles in the magnetic layer experience the influence of each successive local field component for a duration measured in milliseconds.

10. The apparatus of claim 9 wherein the magnetic interaction of said rotating field with the magnetic particles in the fluid magnetic layer also provides a smoothing affect on the outer surface of the fluid magnetic layer.

11. The apparatus of claim 1 wherein said magnetic field defining means includes an array of a plurality of permanent magnets mounted on a non-magnetic base member, said magnets having their outermost pole faces arranged in a magnet plane such that said magnetic field projects outwardly from said magnet plane, said base being disposed for rotation about said axis with said magnet plane substantially parallel to the plane of the magnetic layer such that a composite magnetic field defined by said permanent magnets acting in concert projects into the plane of the magnetic layer.

12. The apparatus of claim 11 wherein said permanent magnets are arranged in an annular array symmetrically disposed about said axis.

13. The apparatus of claim 12 said permanent magnets are elongated bar magnets each having their long dimension lying along a corresponding one of equally spaced radial lines emanating from a center that is coincident with said axis.

14. The apparatus of claim 13 where at least some of said permanent magnets have the same pole face outermost and others of said permanent magnets have the opposite pole face outermost such that there are field direction changes relative to the plane of the magnetic layer in said composite magnetic field.

15. The apparatus of claim 14 wherein said bar magnets from said annular array are arranged in consecutive four magnet groups consisting of a first pair of successive magnets having like pole faces outermost and a second pair of next successive magnets having opposite like pole faces outermost.

16. The apparatus of claim 15 wherein each said four magnet group provides a magnetic field direction rotation of 360° over its length.

17. The apparatus of claim 12 wherein said non-magnetic base is a disk and said permanent magnets are located in corresponding cavities formed in an upper surface of said disk, and said means for effecting rotation of said field includes means for rotating said disk about said axis with said upper surface substantially parallel to and facing plane of the magnetic layer.

18. Appartus for magnetically disorienting magnetic particles in a fluid magnetic layer carried on a non-magnetic support which is being moved so that the magnetic layer advances in a plane, said apparatus comaprising;
  a non-magnetic disk positioned adjacent the fluid magnetic layer in substantially parallel relation to the plane, said disk being rotatable about an axis that is substantially perpendicular to the plane;
  means, including at least one permanent magnet, on said disk for defining a magnetic field that projects into the plane of the magnetic layer; and
  means for spinning said disk so said magnetic field rotates about said axis and interacts magnetically with the particles to cause disorientation of the particles in the magnetic layer.

19. The apparatus of claim 18 wherein said means defining said magnetic field includes a plurality of permanent magnets arranged in an annular array concentrically disposed about said axis.

20. The apparatus of claim 19 wherein some of said magnets have one pole face facing toward the plane and others of said magnets have the opposite pole face facing toward the plane.

21. The apparatus of claim 20 wherein said array comprises repeating groups of four magnets, each said group comprising two successive like pole facing magnets followed by two successive like pole facing magnets of the opposite polarity.

22. The apparatus of claim 19 wherein adjacent magnets in said array interact to form local components of said field, and said means for spinning said disk is set to rotate said field at an angular velocity that is correlated to the linear velocity of the magnetic layer advancing in the plane so that the particles exiting said field experience the influence of each said local component for a duration measured in milliseconds.

23. The apparatus of claim 18 further including means, positioned further downstream from said rotating field, for magnetically orienting the disoriented particles.

24. A method of manufacturing a magnetic recording medium, said method comprising the steps of: providing a fluid magnetic pigment composition including
  magnetic particles, a binder and a solvent; coating said pigment composition on a linearly moving non-magnetic support to form a fluid magnetic layer thereon which is advanced along a plane by said moving support;
  while said magnetic layer is still fluid, applying a rotating magnetic field which projects into said plane and rotates about an axis substantially perpendicular thereto for magnetically disorienting said particles in said fluid magnetic layers; and
  drying said magnetic layer to at least partially solidify said binder and thereby fix the positions of said disoriented particles in said magnetic layer.

25. The method of claim 24 wherein said rotating magnetic field is a composite magnetic field formed by a plurality of local field components, at least some of which have different field directions relative to said plane.

26. The method of claim 25 wherein the rotational velocity of said magnetic field is in a range correlated with the linear velocity of said support such that said particles exiting said rotating field experience the influence of each local field component for a duration measured in milliseconds.

27. The method of claim 26 wherein the interaction of said rotating field with said particles has a smoothing effect on the outer surface of said magnetic layer.

28. The method of claim 27 further including the step of subjecting the fluid magnetic layer to a magnetic field for orienting the particles following passage of the layer through said rotating field, but before drying the layer.

* * * * *

Disclaimer 4,518,627.—*James Foley*, Wellesley; *Fawwaz Habbal*, Cambridge; *John Leahy*, Burlington, all of Mass. APPARATUS AND METHOD FOR DISORIENTING MAGNETIC PARTICLES IN MAGNETIC RECORDING MEDIA. Patent dated May 21, 1985. Disclaimer filed March 16, 1989, by the assignee, Polaroid Corp.

Hereby enters this disclaimer to claims 1, 2, and 24 of said patent.
[ *Official Gazette September* 12, 1989 ]